Aug. 23, 1955    F. R. SHONKA    2,716,168
ELECTRICAL SWITCH
Filed July 3, 1951
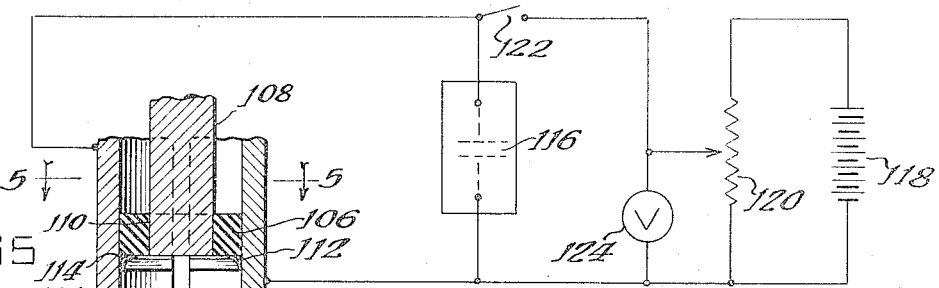
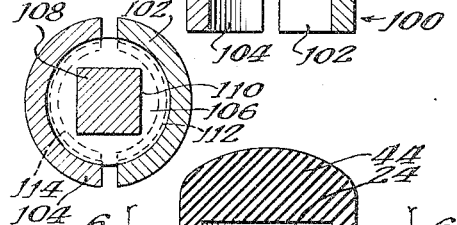
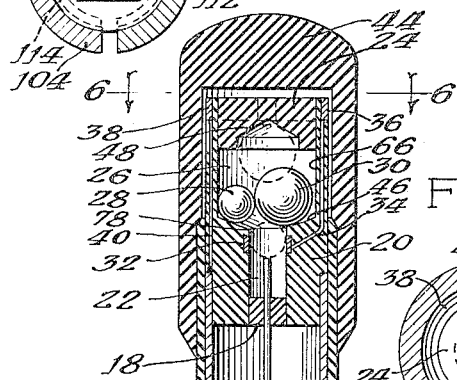
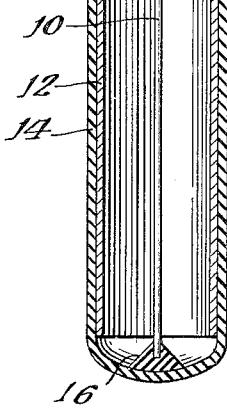
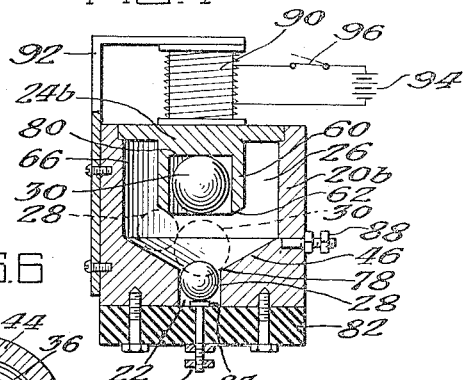
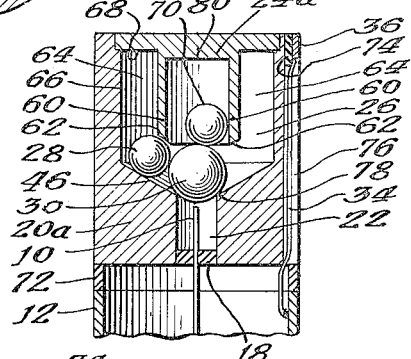
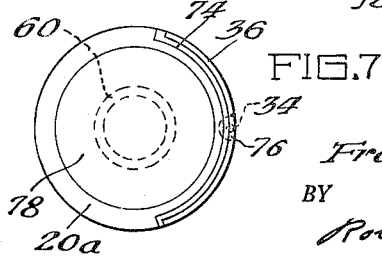
INVENTOR.
Francis R. Shonka
BY
Roland A. Anderson
Attorney

United States Patent Office 2,716,168
Patented Aug. 23, 1955

2,716,168

ELECTRICAL SWITCH

Francis R. Shonka, Riverside, Ill., assignor to the United States of America as represented by the United States Atomic Energy Commission Application July 3, 1951, Serial No. 235,050

14 Claims. (Cl. 200—61.45)

This invention relates to a radiation dosimeter, and more specifically to an electrical switch which is adapted to be used in a radiation dosimeter.

For many years, it has been well known that overdoses of radiation can be injurious to the human body, and that it is necessary to observe precautions in order to avoid such overdoses when working with radiations or radioactive materials. It has been found that the effects of radiation upon the human body are cumulative, and that it takes the human body a substantial period of time to fully recover from the effects of even a small dose of radiation. For this reason, it is customary for persons engaged in occupations using radiations to carry a dosimeter with them at all times, the dosimeter being an instrument which will record the amount of radiation to which it has been subjected. In this manner, the total amount of radiation that a person has been subjected to may be determined.

A very practical form of dosimeter utilizes an ionization chamber. The chamber is charged at the beginning of the working day and carried by the person throughout the day. At the end of the day, the amount of charge remaining upon the ionization chamber is measured, and the loss of charge is a measurement of the amount of radiation to which the person has been subjected. However, it has been found that leakage causes, such as moisture between the contacts of the dosimeter, have led to currents which partially discharge the ionization chamber, hence recording a radiation measurement greater than the radiation actually experienced by the person.

The present invention eliminates this source of error by physically separating an electrode of the ionization chamber from its terminal on the outer surface of the casing of the dosimeter. This is done entirely within a sealed moisture proof chamber by means of a magnetically operated switch, which is hereafter to be described.

It is thus an object of the present invention to provide a switch which may be operated within a sealed moisture proof casing of an ionization chamber from the exterior of the chamber.

It is a further object of this invention to provide a mechanically simple and durable switch which is effective to make and break metallic electrical contact within a sealed chamber, and may be operated wholly from the exterior of the sealed chamber.

Other objects and advantages of this invention will become apparent from a more complete understanding of the invention, which may be had with reference to the drawings, of which:

Figure 1 is a vertical sectional view taken through the center of a dosimeter;

Figure 2 is a schematic electrical circuit diagram of a charging and measuring circuit and a vertical sectional view of a charging plug;

Figure 3 is a sub-assembly view of a modified switch which is suitable for use in the dosimeter shown in Figure 1, and which fragmentarily shows the relation of the modified switch to the ionization chamber;

Figure 4 is a longitudinal sectional view of a third embodiment of the switch mechanism showing its use in a vacuum switch or relay;

Figure 5 is a transverse sectional view of the charging socket taken along line 5—5 of Figure 2;

Figure 6 is a transverse sectional view of the dosimeter taken along line 6—6 of Figure 1; and Figure 7 is a plan view of the switch sub-assembly shown in Figure 3.

The dosimeter shown in Figure 1 utilizes an ionization chamber of a type well known in the art. It consists of a center electrode 10, an outer electrode 12, and a tubular moisture proof casing 14 with one closed end. The center electrode 10 is mounted axially of the outer electrode 12 by means of insulators 16 and 18.

An insulating switch housing 20 is rigidly inserted into open end of the casing 14 and forms an air-tight seal thereto. A central bore 22 extends through the switch housing along the axis thereof, and the center electrode 10 of the ionization chamber extends centrally into the bore 22. The center electrode insulator 18 fits into the bore 22 adjacent to the ionization chamber and axially supports the center electrode 10 in the bore 22. In the end of the switch housing 20 which extends from the open end of the casing 14, the central bore 22 is greatly expanded, the walls of this portion having been designated 66, and a plug 24 seals the open end of this portion of the bore 22, thus forming a cylindrical cavity 26. The portion of the bore 22 between the restricted and expanded portions thereof will be referred to as the mouth 78 of the bore 22. Two metallic balls 28 and 30 are housed within the cavity 26. One ball 28 is smaller than the other, and the larger ball 30 is constructed of ferromagnetic material, and will be referred to as a "magnetic ball." The other ball 28 may be constructed of either paramagnetic or diamagnetic material, and will be referred to as "non-magnetic." Immediately below the cavity 26, in the bore 22, and contiguous to the end of the center electrode 10 which extends into the bore 22 is mounted a circular ring 32. A conductor 34 extends from the ring 32 to a semi-circular contact element 36 mounted on one side of the upper periphery of the switch housing 20. A corresponding semi-circular contact element 38 is mounted on the other side of the upper periphery of the switch housing 20, and is connected to the outer electrode 12 by a conductor 40. A cap 44 fits snugly over the open end of the ionization chamber casing 14 and completely encloses the switch mechanism.

The dimensions of the balls 28 and 30, the bore 22, and the cavity 26 must be carefully selected in order to provide optimum results. The small non-magnetic ball 28 must have a diameter slightly smaller than the diameter of the bore 22, so that it may fall into the bore 22. The diameter of the cylindrical cavity 26 must be slightly greater than the sum of the diameters of the small ball 28 and the large ball 30. A sloping surface 46 is disposed between the mouth 78 of the bore 22 and the cylindrical surface of the cavity 26, however, the degree of slope is not critical. The shortest distance from the sloping surface 46 to the opposite wall of the cavity 26, taken along the normal to the tangential plane at that particular point on the sloping surface, must be slightly greater than the sum of the diameters of the balls 28 and 30, in order to allow the large magnetic ball 30 to be moved out of the mouth 78 of the bore 22 so that the small non-magnetic ball 28 may fall into the bore 22. The exact shape of the plug 24 closing the cavity 26 is not critical as long as these dimensions are observed.

It has been found convenient to fabricate the switch housing 20 of methyl methacrylate resin. The bore 22 may be formed by drilling through the central axis with a number 41 drill. The cylindrical cavity 26 may have a diameter of ¼ inch, thereby being adequate to accommodate a small ball 28 having a diameter of 3/32 of an inch and a large ball 30 having a diameter of ⅛ of an inch. The sloping surface 46 is sloped at an angle of approximately 31° with respect to a plane at the mouth 78 of the bore 22 normal to the axis of the bore 22. In a particular embodiment of the invention the plug 24 is provided with a dome 48 at its center by drilling to a depth of 1/16 of an inch with a number 35 drill. The dome 48 must be large enough to accommodate the large ball 30 in embodiments in which the dome 48 is required in order to provide sufficient distance from all points on the sloping surface 46 to the opposite wall of the cavity to accommodate the two balls 28 and 30. The small non-magnetic ball 28 may be constructed of aluminum, brass or any other conducting non-magnetic material, but the large ball 30 must be constructed of a ferromagnetic material, such as iron.

The dosimeter described above may be most easily charged by removing the cap 44 and inserting it in a charging socket 100. The charging socket may consist merely of a pair of conducting semi-circular elements 102 and 104 mounted by means of an insulator 106. The conducting elements 102 and 104 together form a socket essentially cylindrical in form having a diameter slightly greater than the diameter of the switch housing 20. A magnet 108 is mounted in an orifice which is centrally located in the insulator 106. A pair of spring contacts 112 and 114 are attached to the contact elements 102 and 104 on their inner surfaces to assure good contact with the contact elements 36 and 38 of the dosimeter when it is to be charged.

The charging and measuring circuit it permanently connected to the charging socket 100. An electrometer 116 is connected across the contact elements 102 and 104. A source of voltage consisting of a battery 118 and a potentiometer 120 are connected across the electrometer 116 through a switch 122. A voltmeter 124, connected across the same portion of the potentiometer 120 that is connected across the electrometer 116 when the switch 122 is closed, measures the amount of charge placed upon the electrometer 116.

It is to be noted that the charging socket 100 is oriented so that the dosimeter must be inserted upwardly into the charging socket. As a result, a first force, that of gravity, attracts the non-magnetic ball, and a second force, that of the magnetic field, attracts the ferromagnetic ball 30 in opposite directions. Gravity and the magnetic field need not be the forces applied to the two balls, but there must be a first force attracting one of the balls, and a second force attracting the other ball in the opposite direction.

The dosimeter may be charged in the following manner. The cap 44 is removed from the casing 14 and the dosimeter is inserted upwardly into the charging socket 100. A key and slot may be provided on the charging socket 100 and dosimeter to assure proper orientation of the dosimeter and socket, but is not necessary and none has been provided. The magnet 108 in the charging socket 100 attracts the ferromagnetic ball 30, thereby permitting the non-magnetic ball 28 to roll down the sloping surface 46 into the bore 22. The balls 28 and 30 thus assume the positions indicated by dotted lines in Figure 1, and the small ball 28 establishes contact between the end of the center electrode 10 and the conducting ring 32. In this manner, the center electrode 10 and the outer electrode 12 are electrically connected to the contact elements 36 and 38, respectively. The contact elements 36 and 38 are in contact with the spring contacts 112 and 114 of the charging socket 100, thus establishing electrical connection with the charging and measuring circuit. By closing switch 122, a charge may be placed upon the electrodes of the ionization chamber, thereby charging the ionization chamber to the potential indicated by the voltmeter 124. In practice, this potential is selected by adjustment of the potentiometer 120 to give a full scale deflection of the electrometer 116. The dosimeter may then be removed from the charging socket 100, inverted in order to withdraw the small ball 28 from the bore 22, and the cap 44 replaced upon the casing 14. The dosimeter is now ready for use. The small ball 28 will be unable to fall back into the bore 22 because the large ball 30 will not allow it sufficient space to roll down the sloping surface 46. The large ball 30 will be unable to enter the bore because it has too great a diameter and will not be permitted to do so in any event by the presence of the small ball 28. Hence, the center electrode has been physically isolated from the other elements of the dosimeter, and the dosimeter has no surface between contact points which is subject to moisture and which is in electrical contact with the electrodes 10 and 12 of the ionization chamber.

While in the embodiment of the invention shown in Figure 1, there is a high probability that the non-magnetic ball 28 will be unable to fall into the bore 22 unless the magnetic ball 30 is attracted away from the bore 22, it is possible under certain remote circumstances that the conducting ball 28 may inadvertently provide contact between the central electrode 10 and the contact ring 32 when no magnetic force has been applied to the magnetic ball 30. For this reason, the modified form of switch shown in Figure 3 has been designed to virtually eliminate this possibility. The embodiment of the switch shown in Figure 3 may replace the one shown in Figure 1, and it will be described as a modification of the dosimeter shown in Figure 1. The switch housing 20a, shown in Figure 3, differs from the switch housing 20 shown in Figure 1 only in that it is constructed of a non-magnetic conducting material, for example brass or aluminum, rather than an insulating one. The cavity 26, and the bore 22 are identical with those shown in the embodiment of Figure 1. The most essential difference in the switch embodiment of Figure 3 from that of Figure 1 is that the plug 24a is provided with a cylindrical cup 60 extending into the cavity 26 from the cap 24a. The internal diameter of the cup 60 must be slightly greater than the diameter of the large ball 30, which is to be permanently restrained within the cup 60. The cup 60 extends into the cavity coaxial with the axis of the bore 22 to a depth placing the lip 62 of the cup 60 at a distance from the sloped surface 46 of the cavity 26 just greater than the diameter of the conducting ball 28. Also the lip 62 of the cup 60 is beveled to be parallel to the sloped surface 46 of the cavity 26, thereby leaving sufficient distance between the sloped surface 46 of the cavity 26 and the beveled lip 62 of the cup 60 to permit the passage of the conducting ball 28 therethrough. Spaces 64 between the cup 60 and the walls 66 of the cavity 26 are of sufficient size to permit the conducting ball 28 to travel to the base 68 of the plug 24a. An interference ball 70 is also disposed within the cup 60 immediately adjacent to the plug 24a. Hence, the interference ball 70 is confined to a space between the plug 24a and the magnetic ball 30.

The center electrode 10 of the ionization chamber extends into the bore 22 through the insulator 18 in a manner identical to the embodiment shown in Figure 1. However, in the embodiment of Figure 3, contact is made between the conducting switch housing 20a and the center electrode 10 through the conducting ball 28, and not between the center electrode 10 and a conducting ring, as in the embodiment of Figure 1. In this manner, the conducting housing 20a serves as one of the contacts of the switch, and it is not necessary to provide a contact ring such as is shown in Figure 1. The conducting housing 20a also provides contact with element 104 of the charging socket 100 when the dosimeter is inserted therein, however, it is necessary to dispose a semi-cylindrical contact element 36 on the periphery of the housing 20a adjacent to the plug 24a to provide contact with element 102 or 104 of the charging socket 100 when the dosimeter is inserted therein. An insulating strip 74 is placed between the contact element 36 and the switch housing 20a, in order to provide electrical insulation, and an insulated wire 34 is fitted in a channel 76 along the outer surface of the switch housing 20a and connects element 36 to the cylindrical outer electrode 12. It is also necessary to provide an insulating ring 72 between the outer electrode 12 and the switch housing 20a, which was not required in the embodiment of Figure 1. The casing 14 and cover 44 shown in Figure 1 will be readily seen to be suitable for use with the embodiment of Figure 3 in a manner identical to Figure 1.

Since the magnetic ball 30, in the embodiment shown in Figure 3, is always confined to the space within the cup 60, it is clear that the magnetic ball 30 will always contact the sloping surface 46 of the cavity 26 before the conducting ball 28 is able to reach the mouth 78 of the bore 22. This is especially true, since the interference ball 70 will be continually bouncing with any motion of the dosimeter, thereby bouncing against the magnetic ball 30 and forcing it toward the bore 22. Since there is just enough room to permit the conducting ball 28 to pass between the magnetic ball 30 and the sloping surface 46 of the cavity 26 is roughly one orientation of the balls, namely, in the orientation that exists when magnetic force has restrained the magnetic ball 30 toward the plug 24a and the interference ball 70 is wedged by the force of the magnetic ball 30 between the plug 24a and the magnetic ball 30, there is but a very remote possibility that there can ever be sufficient room to permit the conducting ball 28 to pass between the sloped surface 46 and the magnetic ball 30 into the mouth 78 of the bore 22 without the use of a magnetic field. The constant agitation of the interference ball 70 decreases the possibility of the conducting ball 28 passing between the magnetic ball 30 and the sloped surface 46 of the cavity 26 without the aid of a magnetic field attracting the magnetic ball 30 toward the plug 24a, because the volume within the cup 60 (from the plug 24a to the lips 62 thereof) is just sufficient to contain the magnetic ball 30 and the interference ball 70, and agitation of the interference ball 70 causes it to require greater space.

The interference ball 70, however, is not the primary advantage of the embodiment of Figure 3 over that of Figure 1. The use of the cup 60 to confine the magnetic ball 30 into the center portion of the cavity 26, thereby making it practically certain that the magnetic ball 30 will cover the mouth 78 of the bore 22 before the conducting ball 28 is able to enter the bore 22, decreases the probability of an inadvertent contact between the conducting ball 28, the housing 20a and the electrode 10.

The switch, or latching relay, of Figure 4 makes use of a conducting housing 20b, a magnetic ball 30, and a conducting ball 28 which are identical to those elements as shown in Figure 3, but does not utilize the interference ball. A plug 24b seals the cavity 26 in the same manner as plug 24a in Figure 3, and a cup 60 having beveled lips 62 extends into the cavity 26 in the same manner, as in the embodiment of Figure 3. The distance between the beveled rim 62 of the cup 60 and the sloping surface 46 of the housing 20b is slightly greater than the diameter of the conducting ball 28, as in Figure 3, however, the distance between the mouth 78 of the bore 22 and the inner surface 80 of the plug 24b along the axis of the bore 22 is only slightly greater than the sum of the diameters of the conducting ball 28 and the magnetic ball 30, since space for an interference ball is not required. The bore 22 is sealed by a plate 82 constructed of non-conducting material and attached to the base of the housing 20b. A contact member 84 is mounted centrally in the bore 22, extends through the insulating plate 82 and terminates in a terminal 86. A second terminal 88 in the form of a stud screw is threaded into the conducting housing 20b. An electromagnet 90 is mounted immediately adjacent to the outside surface of the plug 24b by means of a bracket 92. The electromagnet 90 is connected to a battery 94, or other current source, through a switch 96.

Normally, the switch of the relay shown in Figure 4 is operated in an open position, namely, the position in which the balls 28 and 30 and the switch 96 assume the position shown by the dotted lines. The magnetic ball 30 is permanently restricted to the central portion of the cavity 26 by the cup 60, and the conducting ball 28 may only revolve about the magnetic ball 30 on the sloped surface 46 of the housing 20b. The construction of this switch will be seen to be similar to that of the switch shown in Figure 3, except the interference ball 70 in that embodiment is omitted, which somewhat decreases the probability of the conducting ball 28 failing to enter the bore 22 as a result of vibration or other motions. The relay is closed by closing the switch 96, in which case the balls 30 and 28 assume the position shown in solid lines in Figure 4 as a result of the magnet attracting the magnetic ball 30 toward the plug 24b. Contact is made between the conducting housing 20b and the contact member 84 through the conducting ball 28. When the switch 96 is again opened, the magnetic ball 30 will drop into the cavity and rest upon the conducting ball 28 and the sloping surface 46 of the cavity. Hence, the relay does not open by opening the switch 96, and a latching action has been achieved. In order to open the relay, it must be inverted, so that the conducting ball 28 will be made to move out of the bore 22 and assume the dotted position of Figure 4, so that the magnetic ball 30 will be able to close the mouth 78 of the bore 22. It is to be noted that the magnetic ball 30 is unable to deviate from the center portion of the cavity 26 because the cup 60 retains the ball 30 therein. If the two balls 28 and 30 are of nearly equal dimensions, the beveled lip 62 of the cup 60 will permit the passage of the conducting ball 28, but restrict the passage of the magnetic ball 30 in cases where merely a flat lip would permit the passage of either ball.

It has been found that the embodiment of Figure 4 may be constructed using a 3/32 inch iron ball for the magnetic ball 30, and an aluminum ball of .04 inch for the non-magnetic conducting ball 28. Using these balls, the cavity 26 may have a diameter of 0.2 inch, and the cup 60 may have an internal diameter of .096 inch. These dimensions are also suitable for the embodiment of Figure 3 using an interference ball of 1/16 inch, but the distance between the inner surface 80 of the plug 24a and the mouth 78 of the bore 22 must be increased to accommodate the interference ball 70. Using the above dimensions for the embodiment without the interference ball (Figure 4) the distance between the inner surface 80 of the plug 24b and the mouth 78 of the bore 22 should be approximately .134 inch, while this dimension in the embodiment of Figure 3 using an interference ball of 1/16 inch should be approximately .2 inch. The sloped surface 46 of the cavity and the beveled lip 62 of the cup 60 should be about 60 degrees with respect to the axis of the bore 22 in both embodiments.

In the foregoing, three embodiments of the switch have been shown in which the large ball 30 was the magnetic ball. It is of course true, that the small ball 28 could be made the magnetic ball, and that the large ball could be moved away from the mouth 78 of the bore 22 by means of gravitational attraction. It is thus clear that there may be many other embodiments and modifications within the spirit of the present invention, and that the scope of the invention should be construed only by the following claims.

What is claimed is:

1. A device for making and breaking metallic electrical contact comprising, in combination, a housing having a cavity therein and a bore extending into the central portion of the cavity, the surfaces of the cavity adjacent to the bore being tapered into the bore, a non-magnetic ball disposed within the cavity having a diameter slightly less than the distance across the narrowest portion of the bore, a ferromagnetic ball placed within the cavity having a diameter greater than the diameter of the bore, the sum of the diameters of the ferromagnetic ball and the non-magnetic ball being less than the shortest distance across the cavity, magnetic means exterior to the housing to attract the magnetic ball away from the bore, and electrical switching means mounted in the bore actuable by the non-magnetic ball.

2. A device for making and breaking metallic electrical contact comprising, in combination, a non-conducting housing having a cylindrical cavity therein and a circular bore extending into the central portion of the cavity, the surfaces of the cavity adjacent to the bore sloping into the bore, a non-magnetic conducting ball disposed within the cavity having a diameter slightly less than the diameter of the bore, a ferromagnetic ball disposed within the cavity having a diameter greater than the diameter of the bore, the sum of the diameters of the conducting and ferromagnetic balls being less than the shortest distance across the cavity measured normal to the surfaces thereof, magnetic means exterior to the housing to attract the magnetic ball away from the bore, and a pair of electrical contact elements mounted in the bore.

3. A device for making and breaking metallic electrical contact comprising, in combination, a non-conducting housing having a circular bore extending centrally therethrough and a circular orifice extending part way therein from the one side coaxial with the bore, said orifice tapering into the bore, a plug sealed into the orifice forming a cavity in the housing, a non-magnetic conducting ball disposed within the cavity having a diameter slightly less than the diameter of the bore, a ferromagnetic ball placed within the cavity having a diameter greater than the diameter of the bore, the sum of the diameters of the ferromagnetic ball and the conducting ball being less than the shortest distance across the cavity measured normal to the tapered surface of the cavity adjacent to the bore, and a pair of electrical contact elements mounted in the bore, one of said contacts being a ring mounted within the walls of the bore, and the other of said elements being a pin mounted coaxially within the bore and insulated from the ring, said ring contact being mounted closer to the cavity than the pin by a distance approximately equal to the radius of the conducting ball.

4. A device for making and breaking metallic electrical contact comprising, in combination, a non-conducting housing having a cavity therein and a bore extending into the central portion of the cavity, the surface of the cavity adjacent to the bore being tapered into the bore, a non-magnetic conducting ball disposed within the cavity having a diameter slightly less than the distance across the narrowest portion of the bore, a ferromagnetic ball placed within the cavity, the sum of the diameters of the ferromagnetic ball and the conducting ball being less than the shortest distance across the cavity measured normal to the surfaces thereof, and a pair of electrical contact elements mounted in the bore, one of said elements restricting the bore to a diameter less than the diameter of the conducting ball.

5. A device for making and breaking metallic electrical contact comprising, in combination, a housing having a cavity therein and a bore extending into the central portion of the cavity, the surface of the cavity adjacent to the bore being tapered into the bore, means to direct a first force along the bore in a direction away from the cavity, means to direct a second force along the bore in a direction opposite to the first force, a first ball disposed within the cavity of a material that is attracted primarily by the first force, the diameter of said first ball being slightly less than the distance across the narrowest portion of the bore, a second ball of a material primarily attracted by the second force, and electrical switching means mounted in the bore actuable by the first ball.

6. A device for making and breaking metallic electrical contact comprising the elements of claim 5 wherein the second ball has a diameter greater than the bore in combination with cavity partitioning means mounted within the cavity on the surface opposite to the bore, said means defining a shaft for the second ball within the cavity along the axis of the bore, said means extending into the cavity, the distance from the tapered surface of said cavity to said means measured normal to the tapered surface being slightly greater than the diameter of the first ball and less than the diameter of the second ball.

7. In combination, a housing having a cylindrical bore extending centrally therethrough and a cylindrical orifice extending part way therein coaxial with the bore having a diameter greater than the bore, said orifice tapering into the bore, a plug sealed into the orifice forming a cavity in the housing, said plug having a cylindrical cup-shaped member extending into the cavity coaxial with the bore, the open end of said member confronting the bore, a first ball having a diameter greater than the diameter of the bore and less than the inner diameter of the cylindrical member disposed in the cavity on the axis of the bore, and a second ball having a diameter less than the diameter of the bore and less than the distance between the tapered surface of the cavity adjacent to the bore and the end of the contiguous portion of the cylindrical member measured normal to the tapered surface.

8. The elements of claim 7 in combination with means for directing two opposing forces along the axis of the bore, one of said forces primarily attracting the second ball in the direction of the bore, and the other of said forces primarily attracting the first ball away from the mouth of the bore.

9. In combination, the elements of claim 7, and a third ball disposed between the first ball and the plug.

10. In combination, a housing having a cavity therein and a bore extending into the central portion of the cavity, the surface of the cavity adjacent to the bore being tapered into the bore, a first ball disposed within the cavity having a diameter smaller than the smallest distance across the bore, two additional balls disposed within the cavity at least one of which has a diameter greater than the smallest distance across the mouth of the bore, said latter ball being constructed of a material having different magnetic properties from the first ball, and means to confine the two additional balls within a volume along the axis of the bore, said means confining the two additional balls with the larger ball confronting the mouth of the bore and providing space for the motion of these two balls along the axis of the bore at least equal to the sum of the diameters of all three balls.

11. In combination, the elements of claim 10 wherein the ball having a diameter greater than the diameter of the bore is constructed of ferromagnetic material, and the first ball is constructed of non-magnetic material, in combination with magnetic means adjacent to the exterior surface of the housing contiguous to the end of the cavity opposite to the bore to attract the ball confined to the axis of the bore with a diameter greater than the diameter of the bore away from the mouth of the bore.

12. An electrical switch comprising, in combination, an electrically conducting housing having a cylindrical bore extending centrally therethrough and a cylindrical orifice extending partway therein coaxial with the bore and having a diameter greater than the bore, said orifice tapering into the bore, a plug sealed into the orifice forming a cavity in the housing, said plug having a cylindrical cup-shaped member extending into the cavity coaxial with the bore, the open end of said member confronting the bore, a first ball having a diameter greater than the diameter of the bore and less than the inner diameter of the cylindrical member disposed in the cavity on the axis of the bore, a second ball constructed of electrically conducting material having a diameter less than the diameter of the bore and less than the distance between the tapered surface of the cavity adjacent to the bore and confronting open end of the cup-shaped member, and an electrical contact insulated from the housing and disposed within the bore adjacent to the cavity, whereby electrical contact may be made between the second ball, the housing, and the contact.

13. An electrical switch comprising, in combination, a housing having a cavity therein and a bore extending into the central portion of the cavity, the surface of the cavity adjacent to the bore being tapered into the bore, a first ball disposed within the cavity having a diameter smaller than the smallest distance across the bore, two additional balls disposed within the cavity at least one of which has a diameter greater than the smallest distance across the mouth of the bore, said latter ball being constructed of a material having different magnetic properties from the first ball, means to confine the two additional balls within a volume along the axis of the bore, said means confining the two additional balls with the larger ball confronting the mouth of the bore and providing space for the motion of these two balls along the axis of the bore at least equal to the sum of the diameters of all three balls, and electrical switching means mounted in the bore adjacent to the housing actuable by the presence of the first ball within the bore.

14. In combination, a housing having a cavity therein and a bore extending into the cavity, a non-magnetic ball disposed within the cavity having a diameter slightly less than the distance across the narrowest portion of the bore, a ferro-magnetic ball placed within the cavity having a diameter greater than the diameter of the bore, the sum of the diameters of the ferro-magnetic ball and the non-magnetic ball being less than the shortest distance across the cavity, and electrical switching means disposed in the bore actuable by the non-magnetic ball.

References Cited in the file of this patent

UNITED STATES PATENTS

| | | |
|---|---|---|
| 423,912 | Diehl | Mar. 25, 1890 |
| 534,519 | Rosenholz | Feb. 19, 1895 |
| 1,719,742 | Adams | July 2, 1929 |
| 1,799,985 | McCoy | Apr. 7, 1931 |
| 1,964,954 | Leins | July 3, 1934 |

FOREIGN PATENTS

| | | |
|---|---|---|
| 303,560 | Germany | Feb. 5, 1918 |